United States Patent

[11] 3,550,533

| [72] | Inventors | Donald E. McCluckie<br>Aurora;<br>Willard D. Brown, Jr., Oswego, Ill. |
|---|---|---|
| [21] | Appl. No. | 739,526 |
| [22] | Filed | June 24, 1968 |
| [45] | Patented | Dec. 29, 1970 |
| [73] | Assignee | White Consolidated Industries, Inc.<br>Cleveland, Ohio<br>a corporation of Delaware |

[54] COUPLING MECHANISM FOR POWER CONVEYORS
11 Claims, 7 Drawing Figs.

[52] U.S. Cl. ..................................................... 104/100,
104/96
[51] Int. Cl. ...................................................... E01b 25/26,
B65g 17/42
[50] Field of Search .......................................... 104/88, 96,
100, 103, 172, 703, 101

[56] References Cited
UNITED STATES PATENTS

| 2,853,955 | 9/1958 | Bishop et al. ................. | 104/88 |
| 3,099,226 | 7/1963 | Kokoras ....................... | 104/96 |
| 3,176,626 | 4/1965 | Hawkins ....................... | 104/96 |
| 3,257,963 | 6/1966 | King ............................. | 104/96 |

*Primary Examiner*—Arthur L. La Point
*Assistant Examiner*—Robert Saifer
*Attorney*—McNenny, Farrington, Pearne and Gordon ABSTRACT: A coupling mechanism for an overhead conveyor system of the free and powered type is disclosed. The system includes a load track along which load carriages move and a power track along which pusher dogs move. The load track includes a laterally movable track section and means to position a carriage in a predetermined position thereon. Control means cause shifting of the movable track section to position a carriage for coupling when a pusher dog approaches the coupling position. The lugs on the pusher dog are arranged to trap the pusher arm therebetween so that the carriage is automatically coupled to the pusher dog and is moved thereby into the powered position of the system. An escapement mechanism is provided to prevent movement of a subsequent carriage into the movable track section until the coupled carriage is moved out of the movable track section.

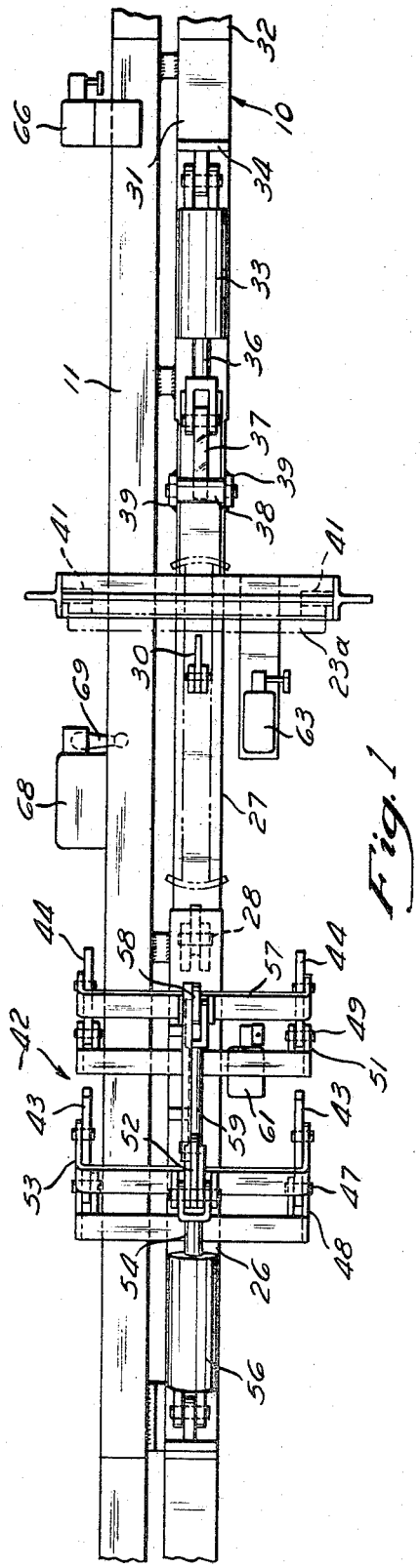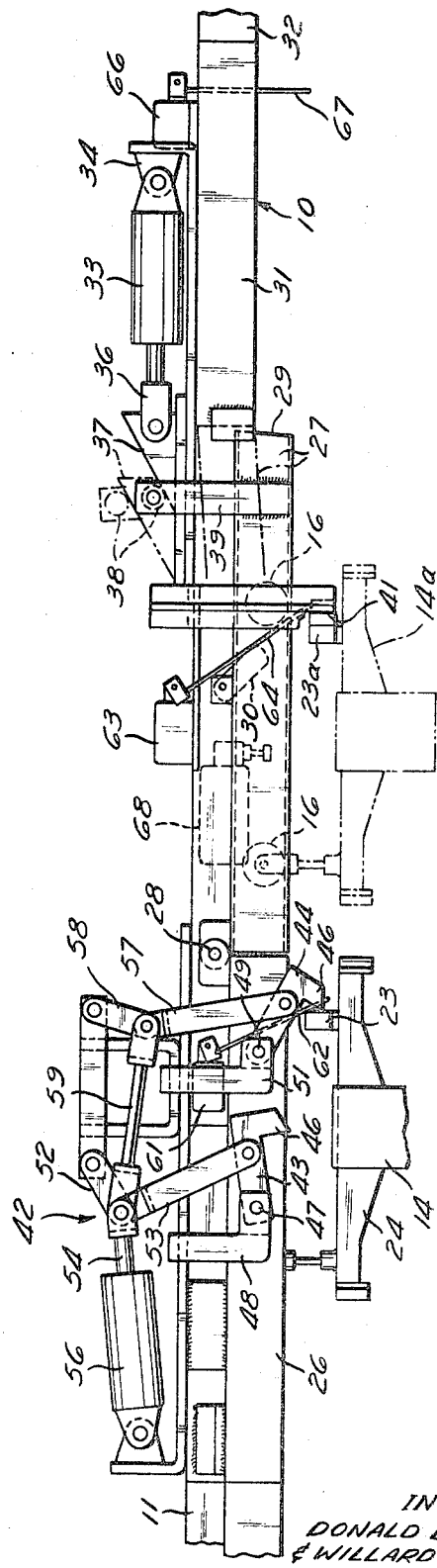

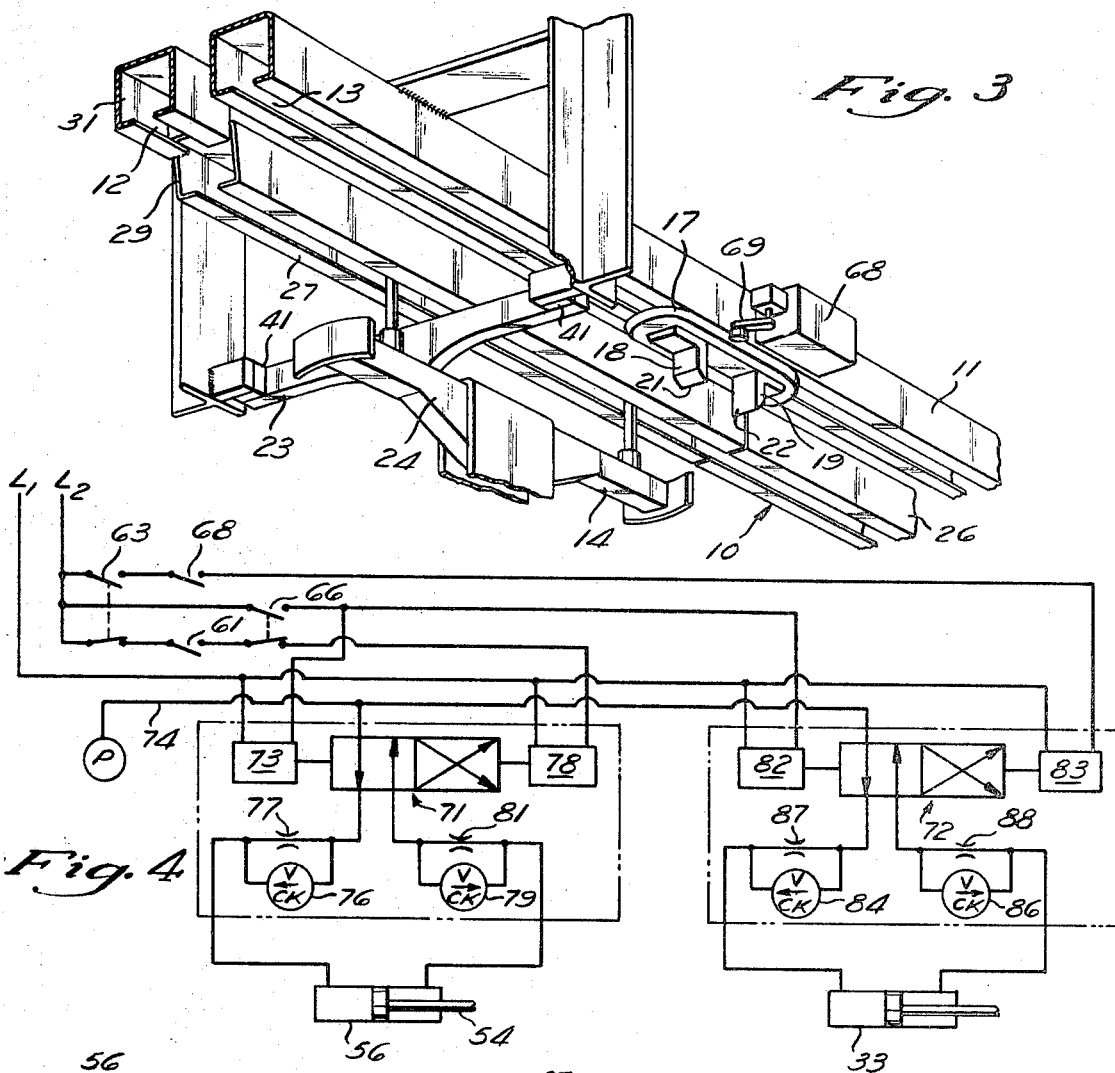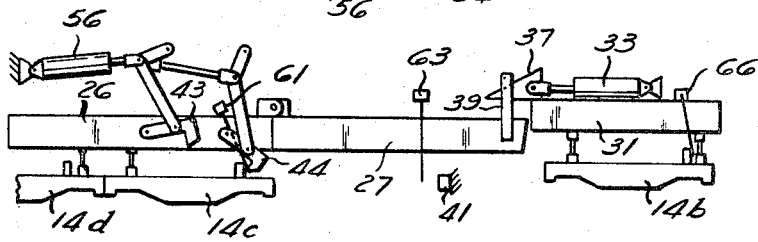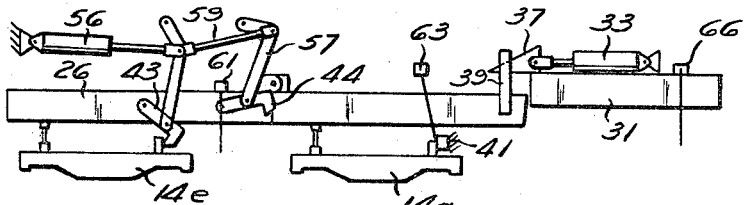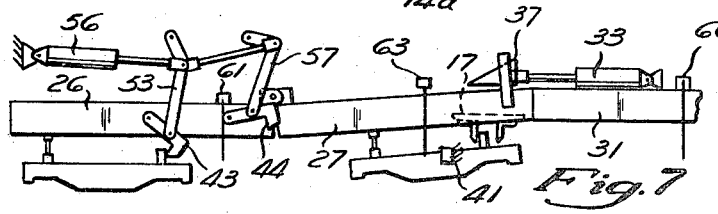

3,550,533

1

COUPLING MECHANISM FOR POWER CONVEYORS

BACKGROUND OF INVENTION

This invention relates generally to automatic dispatch overhead conveyor systems and more particularly to an automatic mechanism for establishing the proper drive connection between load carriages and pusher dogs in in such a system when the system includes free sections and powered sections.

In many instances overhead conveyor systems include free sections for storage or working on articles supported by the system in which the load carriages are free of the main drive of the system, and other sections in which a positive mechanical drive is provided to transport the load carriages from one location to another. Such systems often include a load track along which the carriages move and an adjacent power track which is parallel to the load track at least in those zones where powered carriage movement is required. Such power tracks often include pusher dogs which are carried therealong by powered pusher chains and which are arranged to provide a driving connection with a pusher arm mounted on each of the carriages. The U.S. Letters Pat. to Burmeister et al. No. 3,048,123, discloses a conveyor system of this general type.

The present invention is directed to a novel and improved automatic coupling mechanism for providing a proper coupling between the pusher arm and the pusher dogs when a carriage moves from a free portion of such a conveyor system to a powered portion of the system.

PRIOR ART

Various types of coupling mechanisms have been proposed to establish a driving connection between the pusher arm and the pusher dogs of a free and powered conveyor system. In some systems pliable extensions have been used on the pusher dogs. Such systems tend to wear rapidly and tend to create surging in the conveyor system.

In other systems linkages are provided to retract and extend the pusher arm of the carrier so that it may be retracted from or inserted into the pusher dogs. Such systems are complicated and require a series of levers and mechanical interlocks to be part of each carrier.

SUMMARY OF INVENTION

The present invention provides a coupling mechanism for automatically coupling the pusher dogs and pusher arms of a free and powered conveyor overhead system. The mechanism may be used in a system wherein the pusher arms are rigidly mounted on the carriers. This invention permits the automatic coupling of the pusher dogs and pusher arms in a system wherein a simple, but positive, coupling is provided. The mechanism incorporating this invention insures proper coupling between a predetermined carriage and a predetermined pusher dog. This permits the use of automatic downline switching to control carriage flow.

In the illustrated embodiment of this invention, the load track of the system is provided with a laterally movable section and means to position a load carrier on the laterally movable section in a predetermined position. Sensing means are provided to cause shifting of the movable track section when a pusher dog is approaching the position in which it is coupled to the carriage supported by the movable section.

The various elements are arranged so that the pusher arm of the carriage located on the laterally movable section is clear of the pusher dogs when the movable section is in one position and is moved into proper pusher dog coupling position when the track section moves to the other position. With this arrangement a pusher arm of a single load carriage is moved into position for coupling with a pusher dog.

The illustrated embodiment also provides escapement means to position single carriages in the predetermined position on the laterally movable track section and to prevent subsequent carriages from moving to such movable section until the preceding carriage has been properly connected to an associated pusher dog and moved thereby out of the laterally movable track section.

2

OBJECTS OF INVENTION

It is an important object of this invention to provide a novel and improved overhead conveyor system having coupling means to provide a proper coupling connection between pusher dogs of the system and the pusher arm of a carriage moving into the powered section of such a system.

It is another important object of this invention to provide a novel and improved overhead conveyor system according to the preceding object wherein one carriage at a time is properly positioned for coupling with a pusher dog.

Further objects and advantages will appear from the following description and drawings wherein:

FIG. 1 is a plan view of one coupling mechanism, incorporating this invention, for connecting the pusher dog and pusher arm of a carriage moving into a powered section of the system;

FIG. 2 is a side elevation of the mechanism illustrated in FIG. 1;

FIG. 3 is a fragmentary perspective view of the lower side of the mechanism illustrated in FIGS. 1 and 2 with parts removed for purposes of illustration;

FIG. 4 is a schematic diagram of the electrical and pneumatic control portion of the system;

FIG. 5 is a schematic illustration of the mechanism after coupling is established with one carriage and it has moved out of the coupling mechanism;

FIG. 6 is a schematic illustration similar to FIG. 5 illustrating the system after a carriage moves into position for coupling; and, FIG. 7 is a schematic illustration similar to FIGS. 5 and 6 illustrating the position of the system at the moment coupling is established.

Referring to the drawings, FIGS. 1 through 3 illustrate a structure of a preferred embodiment in accordance with the present invention. This embodiment includes a load track 10 and a power track 11 extending along the side of the load track. Each of the tracks 10 and 11 is formed of box channel members which are open along their lower sides at 12 and 13, respectively. A plurality of load supporting carriages 14 are supported for rolling movement along the length of the load track 10 by rollers 16 which engage and roll along the lower wall of the track 10 adjacent to the opening 12. Preferably lateral rollers, which are journaled for rotation about a vertical axis and are positioned to extend through the opening 12, are provided to laterally guide the carriage in its movement. Reference may be made to the Burmeister et al. patent referred to above for a clear understanding of the support structure of the carriage.

Extending along the power track 11 is a powered chain (not illustrated) on which are mounted at intervals pusher dogs 17 which are best illustrated in FIG. 3. The chain is powered to carry the dogs 17 along the powered track 11. The pusher dogs 17 are positioned below the power track 11 and are connected to the chain through the longitudinal opening 13.

The pusher dogs 17 are provided with spaced depending projections or or lugs 18 and 19 which are spaced from each other in the direction of movement of the pusher dogs and provide opposed surfaces 21 and 22 which project substantially perpendicular to the direction of the pusher dog movement.

Each of the carriages 14 is provided with a laterally extending pusher arm 23 which is rigidly mounted on the carriage frame 24 and extends laterally from the frame 24 in both directions. When the carriage is properly coupled to a pusher dog 17 for movement therewith, one end of the pusher arm 23 is received in the pocket between the two opposed surfaces 21 and 22. The lugs 18 and 19 are pivotally mounted on the pusher dogs 17 so that they normally remain in the depending position illustrated in FIG. 3, but are free to pivot up toward each other to permit entrapment of a pusher arm therebetween. The lugs 18 and 19 are mounted so that they cannot pivot apart beyond the illustrated dependent position. Therefore, they cooperate to control the movement of a carriage having its arm entrapped therebetween. The lug 18 operates to hold a carriage back when moving down inclines and the lug 19 pushes the carriage along level portions and up inclines.

With this arrangement, positive control of the carriage 14 is maintained as long as the pusher arm 23 is properly located between the opposed surfaces of a pusher dog. It should be noted that the arm 23 in the illustrated embodiment extends to both sides of the carriage frame 24. With this arrangement the power track for one portion of the conveyor system can be located on one side of the load track and in another portion of the system can be located on the opposite side of the load track. Normally only one power track is used to drive the carriage along a given portion of the load track.

In order to properly position the pusher arm 23 between the opposed faces of a pusher dog a coupling mechanism incorporating this invention is provided. This mechanism provides a first track section 26 which is fixed in its location with respect to the powered track 11 and a laterally movable section 27 pivotally connected at 28 to the fixed section 26. Located adjacent to the free end 29 of the laterally movable section 27 is a second fixed section 31. In this specification the term "lateral movement" is used in the broad sense to include all movement in directions substantially perpendicular to the length of the movable section 27. As used herein this term includes horizontal or vertical movement. In the illustrated embodiment the movable section 27 is laterally movable in a vertical direction.

The first fixed section 26 is located with respect to the powered track 11 so that the pusher arm 23 of a carriage located thereon is clear of the lugs 18 and 19 of pusher dogs passing therealong. In the illustrated embodiment the track section 26 is located below the powered track 11 and to one side thereof so that the lugs 18 and 19 pass over the pusher arms of carriages supported by the track section 26 with clearance.

The second fixed track section 31 is located with respect to the powered track so that the end of a pusher arm of a carriage supported by the second track section 31 is in the path of lugs 18 and 19 of pusher dogs moving along the adjacent portion of the powered track 11. Therefore, when a pusher arm 23 is properly positioned between the opposed surfaces 21 and 22 of a pusher dog, the carriage moves into the fixed track section 31 and the proper connection is maintained. The relative orientation of the remaining powered portion 32 of the conveyor system which connects with the output end of the fixed section 31 retains this relative relationship so that the drive coupling is maintained.

The laterally movable section 27 is movable from a full line position illustrated in FIG. 2 in which it is aligned with the first fixed section 26 to a second position illustrated in phantom in which the free end 29 is aligned with the adjacent end of the second fixed track section 31. To cause movement between the full line and phantom position of the laterally movable track section, a double-acting pneumatic actuator 33 is provided. A cylinder of the actuator 33 is pivotally connected to a bracket 34 mounted on the load track 10 and the piston 36 of the actuator is pivotally connected to a wedge-shaped cam 37. The cam 37 engages a roller 38 which extends between side plates 39 secured to the laterally movable track section 27. When the actuator 33 is retracted as illustrated in full line, the cam allows the laterally movable section 27 to move down to a position substantially in alignment with the first fixed track section 26. Extension of the actuator 33 causes the cam to move under the roller and causes the free end 29 of the laterally movable track section 27 to move up into alignment with the adjacent end of the second fixed track section 31. The various elements are proportioned so that a load carriage at the position 14a on the laterally movable track section 27 is located so that its pusher arm 23a is spaced below the lugs of the pusher dogs 17 moving thereby, as long as the track section remains in the lowered position. In this position the pusher arm 23a abuts a fixed stop 41 to locate the carriage 14a in a predetermined position with respect to the movable track section 27.

When the movable track section 27 moves to its raised or phantom position, the pusher arm 23a of the carriage at the predetermined position is moved up clear of the stops 41 and into a position in alignment with the lugs 18 and 19 of a pusher dog 17. A control mechanism, described in detail below, is provided to cause extension of the actuator 33 which is timed with the movement of a pusher dog 17 along the powered track 11 so that the arm 23 of a carriage at the position 14a is positioned ahead of the lug 18 and in its path of movement. When the track section is raised, it is tipped upwardly. A latch 30 is provided to prevent the carriage from rolling back along the track section 27 when the track section 27 is raised.

It should be noted that the single movement of the track section from the lower full line position to the raised position accomplishes two functions. First, it moves the pusher arm 23 clear of the stops 41 and also moves the end of the pusher arm 23 into the path of the pusher dogs. As the pusher dog moves along its track the forward lug 18 engages the pusher arm 23 and pivots back and up so that it is carried over the pusher arm 23. The lug 18 then drops down ahead of the pusher arm and the pusher arm is entrapped between the two lugs 18 and 19. Therefore, the required driving connection is provided.

An escapement mechanism 42 is mounted on the first fixed track section 26 to control the movement of the carriages 14 to the movable track section 27 and to insure that only one carriage is located in the operating part of the coupling mechanism at a given time. This escapement mechanism includes two pairs of stop arms 43 and 44 with one arm of each pair located on each side of the load track 10. Each arm 43 and 44 is provided with a lateral projecting end portion 46 adapted to be moved to an operative position in alignment with the pusher arm of a carriage 14 moving along the track section 26 to hold such carriage against movement and a retracted position in which it clears the pusher arms 23.

The arms 43 are pivoted at 47 on a bracket 48 and the arms 44 are pivoted at 49 on a bracket 51. Connected to the arms 43 is a toggle linkage including two links 52 and 53. This linkage is connected to the piston 54 of an actuator 56 and is proportioned so that when the piston 54 is retracted as illustrated in FIG. 2, the arms 43 are lifted to the retracted position clear of the pusher arms 23. A second toggle linkage including two links 57 and 58 is connected to the arms 44 and is also connected to the piston 54 by an operating link 59. This toggle is proportioned so that retraction of the piston 54 to the illustrated position causes extension of the arms 44 to the position illustrated.

When the piston 54 is retracted, the arms 43 are retracted and the arms 44 are extended. Extension of the piston 54 reverses the position of the arms 43 and 44 causing the arms 43 to extend and the arms 44 to retract. Therefore, a single actuator operates to control the two pairs of arms 43 and 44 and the single action of the single actuator insures that one or the other pair of arms is extended while the other pair of arms is retracted.

The mechanism should be installed so that the fixed section 26 is inclined downwardly toward the movable section 27 and the movable section 27 is also n inclined downwardly when it is in its lowered full line position. Therefore, gravity is utilized to move the carriages along the fixed section 26 and the movable section 27 into the position for coupling with the pusher dogs. In FIG. 2 the system is not illustrated in an inclined downward direction to simplify illustration of the structure. Further, in FIG. 2 the second track section 31 is illustrated as parallel to the first track section 26 and, therefore, extends downwardly toward the track portion 32. The movement of a carriage along the track section 32 is controlled by the powered pusher dog so the track section 32 can be inclined upwardly, extend horizontally, or extend downwardly, as desired, as long as the power track is arranged in a similar manner.

The control of the two actuators 33 and 56 is provided by four sensing switches. The first sensing switch 61 is provided with an arm 62 which operates the switch when it is engaged by the pusher arm of a carriage 14 positioned against the arm 44. A second control switch 63 is provided with an arm 64 which operates the switch when it is engaged by the pusher arm 23 of a carriage 14a positioned against the stop 41. A third control switch 66 is provided with an arm 67 positioned to be engaged by the pusher arm of a carriage moving out of the mechanism along the second track section 31. A fourth and final control switch 68 is provided with an arm 69 which engages the side of a pusher dog 17 (illustrated in FIG. 3) to operate the switch when the pusher dog 17 is approaching the coupling position.

The four switches 61, 63, 66, and 68 are connected to control the operation of solenoid valves 71 and 72 which control the operation of the actuators 56 and 33, respectively. The connection of the valves and the switches is illustrated in FIG. 4. The valves 71 and 72 are similar and are two-position, four-way valves arranged to remain in a given position until moved to the other position by an associated solenoid. The valve 71 is caused to shift to the illustrated position by energizing the solenoid coil 78 and in this position connects the cylinder end of the actuator 56 to a supply pressure line 74 so that extension of the piston 54 occurs. In this condition a supply line is connected to the closed end of the cylinder through a check valve 76 which bypasses a flow restriction 77. A second solenoid coil 73 is provided to shift the valve 71 to its other position to cause retraction of the piston 54. When the coil 73 is energized, the valve shifts and supply pressure from the line 74 is supplied to the piston end of the cylinder through a check valve 79 which bypasses a flow restriction 81.

On extension of the actuator, the flow restriction 81 controls the extension speed and on retraction, the flow restriction 77 controls the retraction speed. The two flow restrictions 77 and 81 are preferably adjustable to provide adjustment of the actuator operating speed.

The valve 72 is similar to the valve 71 and is connected to the actuator 33 in a similar manner. The valve is moved to the illustrated position to cause extension of the actuator 33 when a solenoid coil 83 is energized and is shifted to the retracting position when a solenoid coil 82 is energized. Here again check valves 84 and 86 are provided to bypass an associated flow restriction 87 and 88, respectively, so that only one flow restriction operates at a given time.

The switches 61, 63, 66, and 68 are connected to control the operation of the valves 71 and 72 as illustrated in FIG. 4. The switches 63 and 68 each provide normally open contacts which are connected in series between the power imput line $L_2$ and the solenoid 83. The power line $L_1$ is connected to each of the solenoids 73, 78, 82, and 83. Therefore, when the normally open contacts of the switches 63 and 68 are closed, the solenoid 83 is energized and the valve is shifted to the illustrated position to extend the actuator 33.

The switch 66 is provided with a normally open contact connected between the line $L_2$ and the solenoid coils 72 and 82. Therefore, closing of this contact energizes the coils 73 and 82 and shifts the valves 71 and 72 to retract the actuators 33 and 56.

The switch 63 is provided with a normally closed contact connected in series with a normally open contact of the switch 61 and a normally closed contact of the switch 66 between the line power $L_2$ and the solenoid 78. When all three of these contacts are closed, the solenoid coil 78 is energized to shift the valve 71 in the direction causing extension of the actuator 56.

A cycle of operation can be best understood by referring to the schematic illustrations of FIGS. 5 through 7. At the beginning of the cycle the movable track section 27 is in its lowered position with its actuator 33 retracted and the escapement mechanism is in the position with the arms 44 extended and the arms 43 retracted. This is the condition when both of the actuators 33 and 56 are retracted. The retraction of the two actuators has occurred because a carriage in position 14b, which has previously been coupled to a pusher dog 17, has been moved along the second track section 31 to a position where it operates the switch 66 to close its normally open contact and energize the two solenoids coils 73 and 82.

Gravity causes a carriage to move to the position 14c in which it engages the arms 44 to prevent further movement along the first track section 26 and operates the switch 61. In this position an adjacent carriage may abut the rearward end of the carriage 14c in a position 14d. It is recognized that the position of the carriage 14c against the arms 44 is a momentary condition since operation of the switch 61 to close its normally open contact causes the valve 71 to shift producing extension of the actuator 56 and reverse of the escapement levers. The operation of the switch 61 to cause this reversal of the escapement levers occurs only if the normally closed contacts of the switches 63 and 66 remain closed to indicate carriages are not present at the positions 14a and 14b.

Extension of the actuator 56 releases the carriage at the position 14c for movement into the movable track section 27 and causes lowering of the arms 43 to stop the following carriage at a position 14e as illustrated in FIG. 6. The spacing between the levers 43 and 44 is less than the length of the carriages so the arms 43 move down ahead of the pusher arm of the carriage moving forward from the position 14d.

The carriage released by the arms 44 rolls into the movable track section until its pusher arm engages the fixed stop 41 which locates the carriage in a predetermined position 14a with respect to the movable track section. Movement of the carriage to the position 14a operates the switch 63 to close its normally open contact and to open its normally closed contact. Opening of the normally closed contact of the switch 63 prevents the valve 71 from shifting to advance the actuator 56 as long as a carriage remains in the position 14a, but permits the operation of the valve 72 when the switch 68 is closed to indicate that a pusher dog is approaching the coupling position.

When a carriage is in the position 14a and a pusher dog approaches the coupling position, the pusher dog engages the arm 69 and causes closing of the normally open contact of the switch 68. If a carriage is in the position 14a, this causes the solenoid 83 to be energized to shift the valve 72 to the position causing extension of the actuator 33. This causes the movable track section to be moved up so that the arm 23 of the carriage at position 14a is in the path of the lugs of the approaching pusher dog and clear of the stop 41. When the pusher dog reaches the coupling position, the pusher arm 23 is entrapped between the lugs 18 and 19 and the carriage starts to move out of the track section as illustrated in FIG. 7.

The switch 68 is positioned along the power track 11 to be operated by a pusher dog 17 before it reaches the coupling position so that the movable track section 27 will move the pusher arm up into the path of the lugs 18 and 19 ahead of the pusher dog lugs. Therefore, the pusher arm is properly positioned for subsequent coupling.

After the coupling is completed by the extension of the actuator 33, the coupled carriage is carried out of the movable track section 27 into the track section 31 with the actuators remaining in their extended position until the switch 66 is operated to indicate that the mechanism is clear and in condition to receive a subsequent carriage. Operation of the switch 66 causes both of the actuators to retract and returns the system to the position of FIG. 5, completing a cycle of operation.

With a mechanism incorporating this invention, proper coupling of carriages and pusher dogs is achieved without requiring retractable element on the carriage or flexible elements on the pusher dog. Consequently, a positive drive is provided with a simple, but rigid, system which is substantially immune to wear, is more economical to manufacture, and provides operating reliability. It should be understood, however, that if retractable elements on the carriage are required by other portions of the system, the present invention can be utilized to provide proper coupling even though retractable elements are employed. It should also be understood that the coupling mechanism incorporating this invention can be used in systems wherein the power track is located with respect to the load track and other positions. For example, this invention may be incorporated in a system wherein the power track is located above the load track. In such a system the shapes of the pusher arms and pusher dogs must be arranged to provide the required coupling with the particular track arrangement used.

Although a preferred embodiment of this invention is illustrated, it is to be understood that various modifications and rearrangements may be resorted to without departing from the scope of the invention disclosed and claimed herein.

We claim:

1. An overhead conveyor system comprising a load track, a power track disposed adjacent to said load track provided with spaced pusher dogs which are powered for movement along said power track, each of said pusher dogs providing opposed surfaces which are spaced from each other in the direction of movement along said power track and extend substantially perpendicular to such direction of movement, a plurality of load carriers movable along said load track each provided with a pusher arm adapted to be positioned between said opposed surfaces of a pusher dog to provide a driving connection to move said carriages along said load track with a connected pusher dog, said load track being provided with a track section movable from a first position to a second position, means to locate a carriage on said movable track section in a predetermined position with respect thereto, a pusher arm of a carriage in said predetermined position being clear of at least one surface of said pusher dogs when said track section is in said first position and being in the path of both surfaces when said track section is in said second position, and powered sensing means operable to cause said track section to be moved to said second position when a dog is approaching a position with respect to said track section to receive between its surfaces the pusher arm of a carriage at said predetermined position.

2. A conveyor system as set forth in claim 1 wherein a stop is positioned to engage said carriage and retain it in said predetermined position when said track section is in said first position, and movement of said track section to said second position operates to move said carriage clear of said stop.

3. A conveyor system as set forth in claim 1 wherein escapement means are provided to permit movement of a subsequent carriage to said predetermined position only after a preceding carriage is moved out of said predetermined position by a dog on said power track.

4. A conveyor system as set forth in claim 3 wherein said escapement means permits only one carriage to be located on said track section at a time.

5. A conveyor system as set forth in claim 4 wherein a first actuator is provided to operate said escapement means, and a second actuator is provided to move said movable track section between said first and second positions, and sensing means interconnect said actuators to operate them through a predetermined cycle.

6. A conveyor system as set forth in claim 4 wherein said escapement means provides a pair of stop elements at spaced locations along said load track, each stop element being movable from an operative position in which it prevents movement of carriages along said load track and an inoperative position in which it permits movement of a carriage along said load track, and power means are provided to move each stop element to its operative position when the other stop element is moved to its inoperative position.

7. A conveyor system as set forth in claim 6 wherein a single actuator is connected to both stop elements to move them in timed relationship.

8. A conveyor system as set forth in claim 6 wherein the spacing between said stop elements is less than the length of a carriage.

9. A conveyor system as set forth in claim 1 wherein said load track is inclined so that gravity moves said carriages to said predetermined position.

10. A conveyor system as set forth in claim 1 wherein said track section is pivoted at one end to said load track at a location spaced from said predetermined position and moved with pivotal movement between said first and second positions.

11. A conveyor system as set forth in claim 1 wherein said pusher arm is fixed against movement relative to its carriage and at least one of said opposed surfaces is pivotally supported on its pusher dog for movement toward the other opposed surface.